US007937082B2

(12) United States Patent
Ohno et al.

(10) Patent No.: US 7,937,082 B2
(45) Date of Patent: May 3, 2011

(54) MOBILE COMMUNICATION TERMINAL, IC CARD, MOBILE COMMUNICATION SYSTEM, PROGRAM, AND COMMUNICATION CHARGE NOTIFICATION METHOD

(75) Inventors: Takeshi Ohno, Tokyo (JP); Hiroshi Umeno, Tokyo (JP); Hidetoshi Ishikawa, Tokyo (JP)

(73) Assignees: Dai Nippon Printing Co., Ltd. (JP); NTT Docomo, Inc. (JP)

( * ) Notice: Subject to any disclaimer, the term of this patent is extended or adjusted under 35 U.S.C. 154(b) by 729 days.

(21) Appl. No.: 11/401,883

(22) Filed: Apr. 12, 2006

(65) Prior Publication Data
US 2006/0252424 A1    Nov. 9, 2006

(30) Foreign Application Priority Data

Apr. 13, 2005   (JP) .................................. 2005-115536

(51) Int. Cl.
*H04W 4/00*   (2009.01)
(52) U.S. Cl. ............... 455/432.1; 455/412.1; 455/414.2; 455/455
(58) Field of Classification Search .................. 455/406, 455/412.1, 412.2, 414.2, 445, 432.1, 456.3
See application file for complete search history.

(56) References Cited

U.S. PATENT DOCUMENTS

| | | | | |
|---|---|---|---|---|
| 5,027,388 A | * | 6/1991 | Bradshaw et al. | 379/114.1 |
| 5,303,297 A | * | 4/1994 | Hillis | 455/406 |
| 5,862,471 A | * | 1/1999 | Tiedemann et al. | 455/406 |
| 6,101,379 A | * | 8/2000 | Rahman et al. | 455/406 |
| 6,125,173 A | * | 9/2000 | Jagadish et al. | 379/114.1 |
| 6,195,543 B1 | | 2/2001 | Granberg | |
| 6,246,870 B1 | * | 6/2001 | Dent et al. | 455/405 |
| 6,324,394 B1 | * | 11/2001 | Vazvan | 455/406 |
| 6,332,579 B1 | | 12/2001 | Ritter | 235/492 |
| 6,453,030 B1 | * | 9/2002 | Boutwell et al. | 379/114.2 |
| 6,470,182 B1 | * | 10/2002 | Nelson | 455/432.1 |
| 6,493,547 B1 | * | 12/2002 | Raith | 455/405 |
| 6,577,717 B1 | * | 6/2003 | Henon | 379/114.01 |
| 6,650,886 B1 | * | 11/2003 | Lundstrom | 455/406 |

(Continued)

FOREIGN PATENT DOCUMENTS

AU          752 650          9/2002

(Continued)

OTHER PUBLICATIONS

Japanese Patent Office communication issued in related application JP 2005-115536, mailed Aug. 3, 2010.

*Primary Examiner* — Charles N Appiah
*Assistant Examiner* — Kwasi Karikari
(74) *Attorney, Agent, or Firm* — Bacon & Thomas, PLLC

(57) ABSTRACT

The present invention provides a mobile communication terminal, an IC card, a mobile communication system, a program, and a communication charge notification method capable of easily indicating roaming communication charges and preventing a user from being unexpectedly charged for communication. A mobile phone 10 detects that it is located in a country B as a roaming area based on information transmitted from a base station 32, inquires of a charge information related server 24 whether or not a communication charge information stored in a storage section 16 is the latest communication charge information, when the communication charge information is not the latest communication charge information, updates the stored communication charge information based on the communication charge information transmitted from the charge information related server 24, reads the communication charge information of the country B from the storage section 16, and displays the communication charge information on a display section 14.

15 Claims, 7 Drawing Sheets

U.S. PATENT DOCUMENTS

| | | | |
|---|---|---|---|
| 6,980,794 B1* | 12/2005 | Hamada et al. | 455/407 |
| 7,003,299 B2* | 2/2006 | Amin | 455/445 |
| 7,016,665 B2* | 3/2006 | Tamaki et al. | 455/406 |
| 7,068,997 B2* | 6/2006 | Benco et al. | 455/407 |
| 7,295,830 B2* | 11/2007 | Lippelt | 455/406 |
| 7,496,090 B2* | 2/2009 | Jiang | 370/354 |
| 2006/0205404 A1* | 9/2006 | Gonen et al. | 455/432.1 |

FOREIGN PATENT DOCUMENTS

| | | |
|---|---|---|
| JP | 2000-261575 | 9/2000 |
| JP | 2000-270360 | 9/2000 |
| JP | 2000-332918 | 11/2000 |
| JP | 2001-268274 | 9/2001 |
| JP | 2002-505061 | 2/2002 |
| JP | 2002-111910 | 4/2002 |
| JP | 2003-061132 | 2/2003 |
| JP | 2004-236182 | 8/2004 |
| KR | 20040066442 | 7/2004 |
| WO | 95/28062 | 10/1995 |
| WO | 98/59504 | 12/1998 |
| WO | 99/46926 | 9/1999 |
| WO | 2004/014101 | 2/2004 |

* cited by examiner

FIG. 7

| COUNTRY AND REGION | COUNTRY CODE | TIME DIFFERENCE | COMMUNICATION PROVIDER | COMMUNICATION CHARGE (PER MINUTE) | | | | |
|---|---|---|---|---|---|---|---|---|
| | | | | OUTGOING CALL | | | INCOMING CALL | |
| | | | | DOMESTIC CALL | INTERNATIONAL CALL TO JAPAN | CALL TO COUNTRY OTHER THAN JAPAN | TRANSFER INCOMING CALL | INCOMING CALL |
| USA | 1 | -17~-14 | A | ¥120 | ¥150 | ¥270 | ¥60 | ¥130 |
| GUAM | 1 | +1 | B | ¥90 | ¥190 | ¥290 | ¥60 | ¥90 |
| HAWAII | 1 | -19 | A | ¥120 | ¥150 | ¥270 | ¥60 | ¥130 |
| UK | 44 | -9 | C | ¥80 | ¥180 | ¥280 | ¥120 | ¥0 |
| SOUTH KOREA | 82 | ±0 | D | ¥60 | ¥130 | ¥270 | ¥80 | ¥0 |
| ... | ... | ... | ... | ... | ... | ... | ... | ... |

MOBILE COMMUNICATION TERMINAL, IC CARD, MOBILE COMMUNICATION SYSTEM, PROGRAM, AND COMMUNICATION CHARGE NOTIFICATION METHOD

BACKGROUND OF THE INVENTION

1. Field of the Invention

The present invention relates to a roaming mobile communication terminal, an IC card provided in the mobile communication terminal, a mobile communication system, a program executed by the mobile communication terminal, and a communication charge notification method of notifying a user of communication charge information for roaming communication of the mobile communication terminal.

2. Description of Related Art

A mobile communication system includes a home location register (HLR) which manages movement and calling of a mobile communication terminal such as a mobile phone. Information for specifying each mobile communication terminal which receives a communication service in the mobile communication network (home network), location information indicating the location of each mobile communication terminal, subscriber information indicating the basic communication service (e.g. normal telephone call service) provided to each mobile communication terminal, and the like are registered in the HLR. Location registration (attachment) occurs when a mobile communication terminal is turned on or a mobile communication terminal is located in the service area of a home network or a roaming network. The HLR may update location information during attachment. The location information includes a country identification code, a communication network code, and a location code indicating the location of the mobile communication terminal. When the location information differs from the location information at the latest attachment, or whenever the location information is changed due to movement of the mobile communication terminal beyond the service area of the network, the HLR receives a request (location registration request) from the mobile communication terminal through a base station, and the request is registered (location registration). A mobile communication system controls call connection based on the subscriber information registered in the HLR when the mobile communication terminal has made a call or the mobile communication terminal has received a call.

A roaming service such as an international roaming service which allows a mobile communication terminal used in Japan to be used in foreign countries has been realized by a mobile communication system. The term "roaming" means that the communication provider which manages a home network makes an agreement with a communication provider which manages another mobile communication network to provide the home network user with a similar service on another mobile communication network, or means this service.

When the mobile communication terminal issues a location registration request in an area in which the mobile communication terminal can roam (roaming area), the location registration request is transferred to the mobile communication system of the home network through a switchboard to which the mobile communication terminal is connected, whereby the location information stored in the HLR is updated and the location is registered. The HLR transmits the subscriber information to the switchboard to which the mobile communication terminal is connected, and the switchboard controls call connection based on the subscriber information. When the mobile communication terminal makes a call or receives a call in the roaming area, the HLR transmits the subscriber information to the switchboard to which the mobile communication terminal is connected, and the switchboard controls call connection based on the subscriber information.

Various inventions have been made to improve roaming service and increase processing efficiency.

For example, a communication system has been disclosed which provides an appropriate service when distributing content using a roaming service taking the destination country and region into consideration (see JP-A-2004-236182).

A mobile communication service control method and a mobile communication service control system capable of easily providing a service to a roaming user in a roaming area have also been disclosed (see JP-A-2003-61132).

SUMMARY OF THE INVENTION

However, the communication charges for the international roaming service (see FIG. 7) are significantly higher than the domestic communication charges. Moreover, the amount of charges varies depending on the country the user is visiting. There may be a case where the user is charged when receiving a call using the international roaming service depending on the country (e.g. the United States of America).

Therefore, the user may unexpectedly incur high communication charges. On the other hand, in order to know the communication charges before making a call, the user must access the communication provider through the Internet or the like, designate the origin country and the destination country, and search for the communication charges corresponding to the communication environment. This process is troublesome and imposes a burden on the user.

An object of the present invention is to provide a mobile communication terminal, an IC card, a mobile communication system, a program, and a communication charge notification method capable of easily indicating roaming communication charges and preventing a user from being unexpectedly charged for communication.

The present invention achieves the above object by the following means. The following means is provided with symbols corresponding to the embodiments of the present invention so that the present invention is readily understood. Note that the present invention is not limited thereto.

A first aspect of the present invention provides a mobile communication terminal (10) comprising: roaming area detection means (11, S110, 18, S310) for detecting whether or not the mobile communication terminal is located in a roaming area; communication charge information acquisition means (11) for acquiring communication charge information of the roaming area in which the mobile communication terminal is located when the roaming area detection means has detected that the mobile communication terminal is located in the roaming area; and communication charge information notification means (11, 14, S160, 11, 14, S370) for notifying a user of the communication charge information acquired by the communication charge information acquisition means.

In the mobile communication terminal (10) according to the first aspect of the present invention, the communication charge information notification means may notify the user of the charge information at an appropriate timing.

The mobile communication terminal (10) according to the first aspect of the present invention may comprise: base station transmission information reception means (13, S100, 13, S300) for receiving information transmitted from a base station (22, 32); wherein the roaming area detection means may detect that the mobile communication terminal is located in the roaming area based on the information received by the base station transmission information reception means; and wherein the communication charge information notification means may include display means (14) for displaying the communication charge information acquired by the communication charge information acquisition means.

In the mobile communication terminal (10) according to the first aspect of the present invention, the communication charge information acquisition means may include communication charge information request means for requesting a mobile communication system to provide the communication charge information of the roaming area in which the mobile communication terminal is located, and communication charge information reception means for receiving the communication charge information transmitted from the mobile communication system in response to the request from the communication charge information request means.

The mobile communication terminal (10) according to the first aspect of the present invention may comprise: communication charge information storage means (16) for storing the communication charge information of each roaming area; wherein the communication charge information acquisition means may include communication charge information read means (11) for reading the communication charge information of the roaming area in which the mobile communication terminal is located from the communication charge information storage means based on the information received by the base station transmission information reception means.

The mobile communication terminal (10) according to the first aspect of the present invention may comprise: update necessity inquiry means (11, 13, S120) for inquiring of a mobile communication system (2) whether or not it is necessary to update the communication charge information stored in the communication charge information storage means; updated information reception means (11, 13, S150) for receiving updated information transmitted from the mobile communication system when the mobile communication system has determined that it is necessary to update the communication charge information in response to the inquiry from the update necessity inquiry means; and update means (11) for updating the communication charge information stored in the communication charge information storage means based on the updated information received by the updated information reception means.

The mobile communication terminal (10) according to the first aspect of the present invention may comprise: roaming area notification means for notifying the user that the roaming area detection means has detected that the mobile communication terminal is located in the roaming area; wherein the communication charge information notification means may notify the user of the communication charge information acquired by the communication charge information acquisition means when directed by the user.

In the mobile communication terminal (10) according to the first aspect of the present invention, when the user has issued a call instruction or a call preparation instruction in the roaming area in which the mobile communication terminal is located, the communication charge information notification means may notify the user of the communication charge information for communication with the destination.

In the mobile communication terminal (10) according to the first aspect of the present invention, when receiving a call in the roaming area in which the mobile communication terminal is located, the communication charge information notification means may notify the user of the communication charge information for communication after receiving the call when the receiving call has been processed before the communication is established.

In the mobile communication terminal (10) according to the first aspect of the present invention, when the roaming area detection means has detected that the mobile communication terminal is located in two or more roaming areas, the communication charge information acquisition means may acquire the communication charge information of each of the roaming areas in which the mobile communication terminal is located; and the communication charge information notification means may notify the user of the communication charge information of each of the roaming areas acquired by the communication charge information acquisition means.

A second aspect of the present invention provides an IC card (18) removable from a mobile communication terminal and capable of communicating with the mobile communication terminal in which the IC card is installed, the IC card comprising: roaming area detection means for detecting whether or not the mobile communication terminal is located in a roaming area based on information received by the mobile communication terminal, in which the IC card is installed, from a base station; and communication charge information display request means for requesting the mobile communication terminal to display communication charge information of the roaming area in which the mobile communication terminal is located when the roaming area detection means has detected that the mobile communication terminal is located in the roaming area.

The IC card according to the second aspect of the present invention may comprise: communication charge information acquisition means for acquiring the communication charge information of the roaming area from a mobile communication system through the mobile communication terminal in which the IC card is installed; wherein, when the roaming area detection means has detected that the mobile communication terminal is located in the roaming area, the communication charge information display request means may transmit the communication charge information acquired by the communication charge information acquisition means to the mobile communication terminal and request the mobile communication terminal to display the communication charge information.

A third aspect of the present invention provides a mobile communication system (2-2) for allowing roaming communication of a mobile communication terminal, the mobile communication system comprising: roaming area detection means (24-2, S210) for detecting whether or not the mobile communication terminal is located in a roaming area based on a location registration request received from the mobile communication terminal; communication charge information storage means (25) for storing communication charge information indicating communication charges for the roaming communication; communication charge information read means (25) for reading the communication charge information of the roaming area in which the mobile communication terminal is located from the communication charge information storage means; and communication charge information transmission means (25, 24-2) for transmitting the communication charge information read by the communication charge information read means to the mobile communication terminal.

A fourth aspect of the present invention provides a program for execution by a mobile communication terminal, the program comprising: a roaming area detection procedure (S110, S310) of detecting whether or not the mobile communication terminal is located in a roaming area; a communication charge information acquisition procedure of acquiring communication charge information of the roaming area in which the mobile communication terminal is located when the roaming area detection procedure has detected that the mobile communication terminal is located in the roaming area; and a communication charge information notification procedure (SI 60, S370) of notifying a user of the communication charge information acquired by the communication charge information acquisition procedure.

The program according to the fourth aspect of the present invention may comprise: a base station transmission information reception procedure (S100, S300) of receiving information transmitted from a base station; wherein the roaming area detection procedure may detect that the mobile communication terminal is located in the roaming area based on the information received by the base station transmission information reception procedure; and wherein the communication charge information notification procedure may include a display procedure (S160, S370) of displaying the communication charge information acquired by the communication charge information acquisition procedure.

In the program according to the fourth aspect of the present invention, the communication charge information acquisition procedure may include a communication charge information request procedure of requesting a mobile communication system to provide the communication charge information of the roaming area in which the mobile communication terminal is located, and a communication charge information reception procedure of receiving the communication charge information transmitted from the mobile communication system in response to the request from the communication charge information request procedure.

In the program according to the fourth aspect of the present invention, the communication charge information acquisition procedure may include a communication charge information read procedure of reading the communication charge information of the roaming area in which the mobile communication terminal is located from the stored communication charge information based on the information received by the base station transmission information reception procedure.

The program according to the fourth aspect of the present invention may comprise: an update necessity inquiry procedure (S120, S320) of inquiring of a mobile communication system whether or not it is necessary to update stored communication charge information; an updated information reception procedure (S150, S350) of receiving updated information transmitted from the mobile communication system when the mobile communication system has determined that it is necessary to update the communication charge information in response to the inquiry from the update necessity inquiry procedure; and an update procedure of updating the stored communication charge information based on the updated information received by the updated information reception procedure.

The program according to the fourth aspect of the present invention may comprise: a roaming area notification procedure of notifying the user that the roaming area detection procedure has detected that the mobile communication terminal is located in the roaming area; wherein the communication charge information notification procedure may notify the user of the communication charge information acquired by the communication charge information acquisition procedure when directed by the user.

In the program according to the fourth aspect of the present invention, when the user has issued a call instruction or a call preparation instruction in the roaming area in which the mobile communication terminal is located, the communication charge information notification procedure may notify the user of the communication charge information for communication with the destination.

In the program according to the fourth aspect of the present invention, when receiving a call in the roaming area in which the mobile communication terminal is located, the communication charge information notification procedure may notify the user of the communication charge information for communication after receiving the call when the receiving call has been processed before the communication is established.

In the program according to the fourth aspect of the present invention, when the roaming area detection procedure has detected that the mobile communication terminal is located in two or more roaming areas, the communication charge information acquisition procedure may acquire the communication charge information of each of the roaming areas in which the mobile communication terminal is located; and the communication charge information notification procedure may notify the user of the communication charge information of each of the roaming areas acquired by the communication charge information acquisition procedure.

A fifth aspect of the present invention provides a communication charge notification method for execution by a mobile communication system (1) for notifying a user of communication charge information for roaming communication of a mobile communication terminal (10), the method comprising: an area detection step (S110, S210, S310) of detecting whether or not the mobile communication terminal is located in a roaming area based on information received by the mobile communication terminal from a base station (22, 32); a communication charge information acquisition step of acquiring communication charge information of the roaming area in which the mobile communication terminal is located when the area detection step has detected that the mobile communication terminal is located in the roaming area; and a communication charge information notification step (S160, S250, S370) of notifying the user of the communication charge information acquired by the communication charge information acquisition step.

According to the mobile communication terminal, the IC card, the mobile communication system, the program, and the communication charge notification method of the present invention, the following effects can be obtained.

(1) When the mobile communication terminal has detected that the mobile communication terminal is located in the roaming area, the mobile communication terminal displays the communication charge information of the roaming area to notify the user of the communication charges. Therefore, the user can be simply notified of the communication charges before performing roaming communication, whereby convenience to the user can be improved, and the user can be prevented from being unexpectedly charged for the use of roaming.

(2) In particular, convenience to the user can be further improved by notifying the user of the communication charges at an appropriate timing set in advance.

(3) Since the mobile communication terminal detects that the mobile communication terminal is located in the roaming area based on the information (e.g. location registration area information) transmitted from the base station, the location of the mobile communication terminal can be efficiently detected by utilizing known processing performed between the mobile communication terminal and the mobile communication system. Moreover, the present invention can be realized without modifying a known mobile communication system to a large extent.

(4) Since the mobile communication terminal acquires the communication charge information by reading the stored communication charge information, an increase of the amount of data transferred can be reduced in comparison with the case of acquiring the communication charge information from the mobile communication system, whereby the processing speed can be increased, and the present invention can be readily realized.

(5) Since the mobile communication terminal updates the communication charge information based on the updated information received from the mobile communication system, the user can be notified of correct communication charge information.

(6) Since the mobile communication terminal notifies the user that the mobile communication terminal is located in the roaming area and notifies the user of the communication charges according to the instruction, the user can easily know a change in the communication charges and can easily know the communication charges if necessary.

(7) Since the mobile communication terminal notifies the user of the communication charge information for communication with the destination when the user has issued a call instruction or a call preparation instruction in the roaming area, the user can be appropriately notified of the communication charge information, because the user can determine whether or not to proceed with the call based on the communication charge information displayed in relation to the call operation.

(8) Since the mobile communication terminal notifies the user of the communication charge information when processing for receiving a call has been performed before the communication is established when receiving a call in the roaming area, the user can be appropriately notified of the communication charge information, because the user can know the communication charges immediately before answering the call and determine whether or not to answer the call.

(9) Since the mobile communication system stores the communication charge information and provides the communication charge information to the mobile communication terminal, the user can be notified of correct communication charge information.

(10) Since the user is notified of the communication charge information of each roaming area when it has been detected that the mobile communication terminal is located in two or more roaming areas, the user can select the communication network through which the user communicates based on the communication charge information.

(11) Since the IC card includes the roaming area detection means and the communication charge information display request means, the present invention can be realized without modifying a known mobile communication terminal to a large extent. Likewise, even if the user replaces the mobile communication terminal with another mobile communication terminal, the present invention can be easily realized by providing the IC card to the new mobile communication terminal.

Other objects, features, and advantages of the invention will hereinafter become more readily apparent from the following description.

BRIEF DESCRIPTION OF THE DRAWINGS

FIG. 7 is a communication charge table indicating communication charges for international roaming.

DETAILED DESCRIPTION OF THE INVENTION AND PREFERRED EMBODIMENT

The present invention achieves the object of easily indicating roaming communication charges and preventing a user from being unexpectedly charged for communication by a mobile communication terminal comprising a base station transmission information reception section which receives information being transmitted from a base station, an area location detection section which detects whether or not the mobile communication terminal is located in a roaming area based on the information received by the base station transmission information reception section, a communication charge information acquisition section which acquires communication charge information of the roaming area when the area location detection section has detected that the mobile communication terminal is located in the roaming area, and a communication charge information notification section which notifies a user of the communication charge information acquired by the communication charge information acquisition section.

First Embodiment

The present invention is described below in detail by way of embodiments with reference to the drawings.

Figure 1:
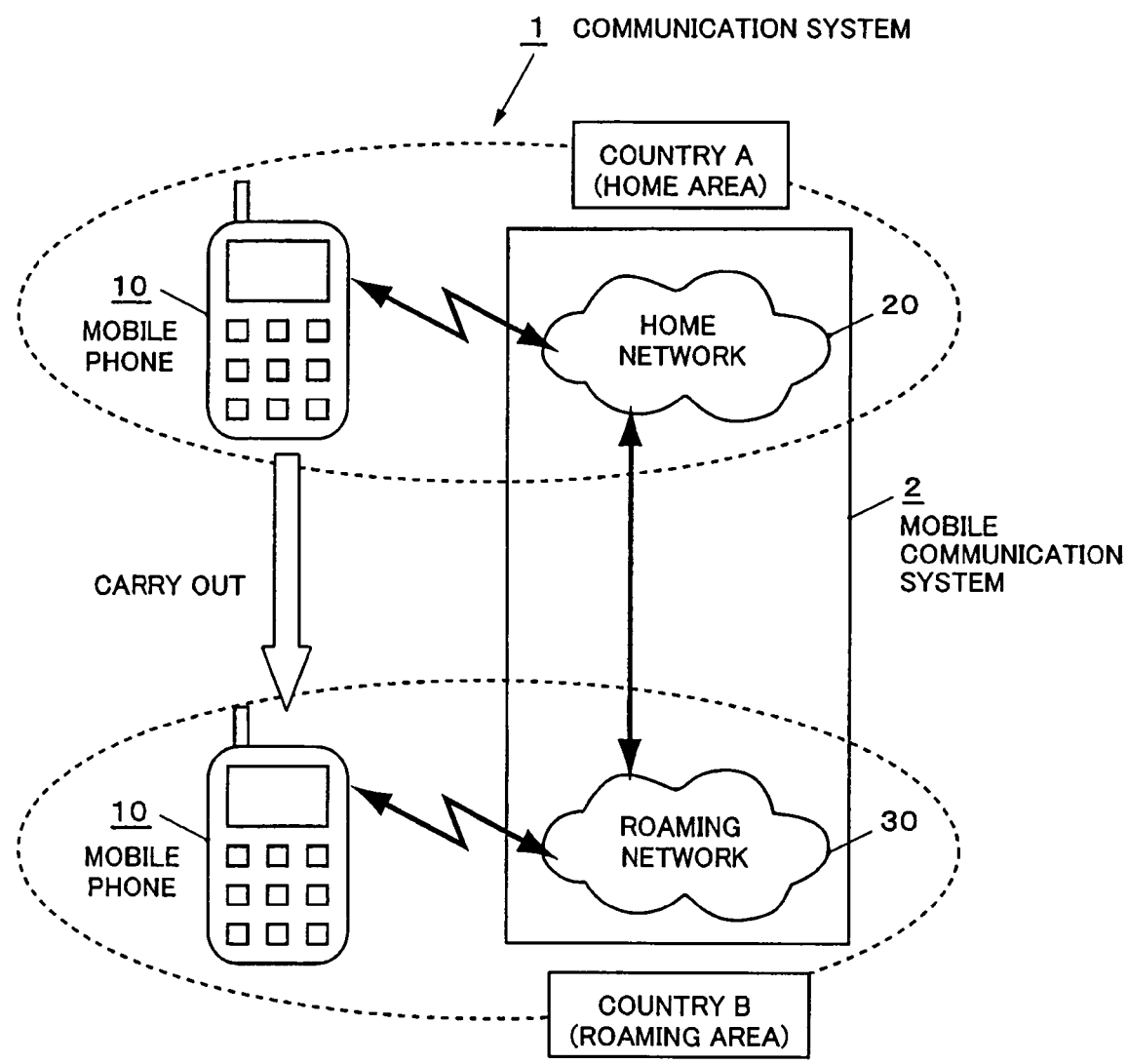
FIG. 1 is a view showing a schematic configuration of a mobile communication system according to one embodiment of the present invention (first embodiment).

FIG. 1 is a view showing a schematic configuration of a mobile communication system according to a first embodiment of the present invention.

As shown in FIG. 1, a communication system 1 includes a mobile phone 10, a mobile communication system 2 which mediates communication between the mobile phone 10 and another communication terminal, and the like. The communication system 1 allows the mobile phone 10 carried out from a country A (home area of the mobile phone 10) to a country B (roaming area) during traveling or the like to communicate (voice communication or data communication) with another communication terminal by roaming.

In general, the home area in which the communication service using a home network is provided and the roaming area in which the communication service using a roaming network is provided differ regionally. Specifically, the home area and the roaming area differ depending on the country, such as the case where the home area and the roaming area exist in a single country or the case where two or more roaming areas exist in a single country. The following description is given on the assumption that the home area exist in the country A and the roaming area exist in the country B for convenience.

Figure 2:
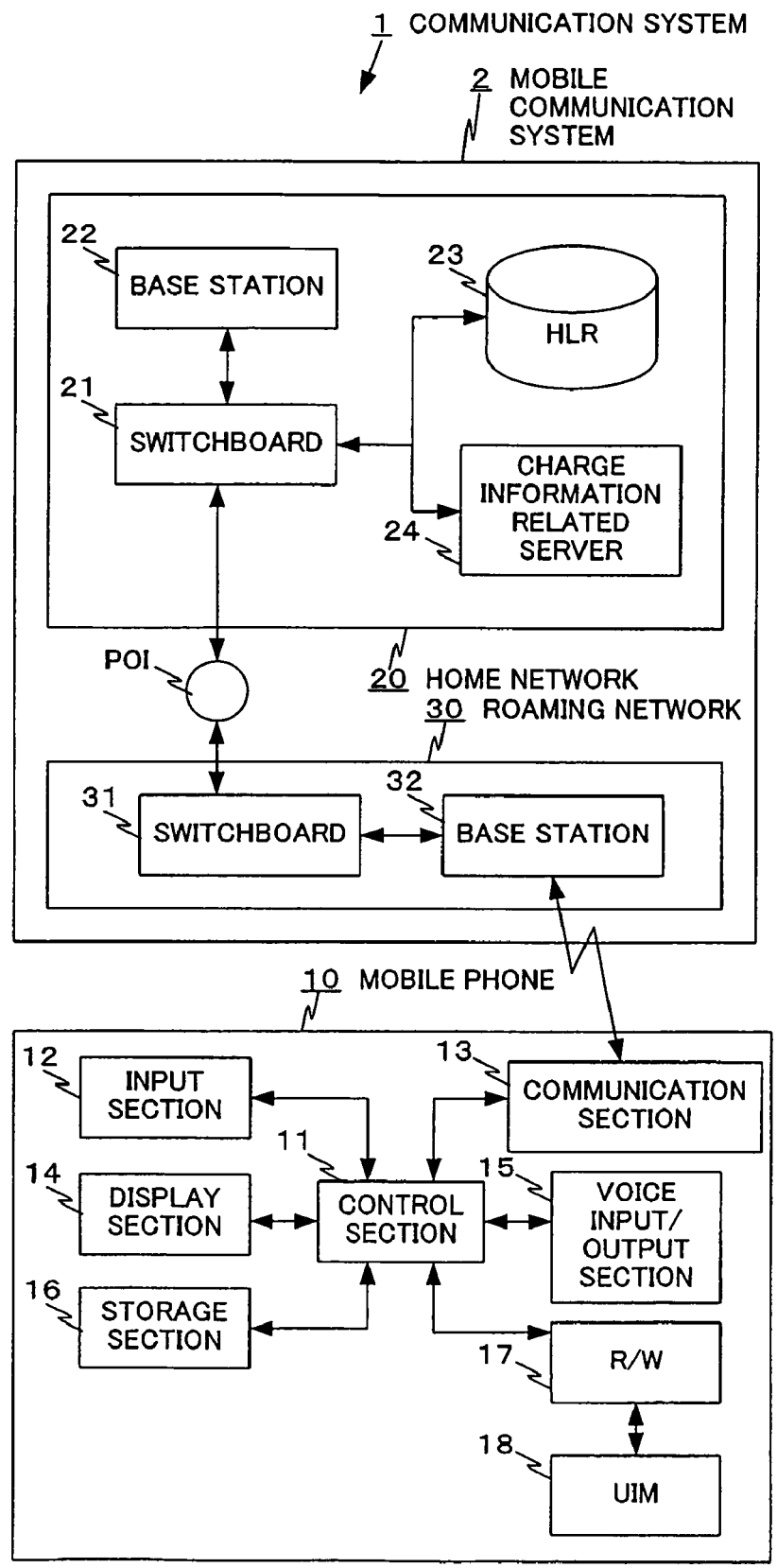
FIG. 2 is a block diagram showing a configuration of a mobile communication terminal and a mobile communication system according to the present invention (first embodiment).

FIG. 2 is a block diagram showing a configuration of a mobile communication terminal and a mobile communication system according to the first embodiment of the present invention.

As shown in FIG. 2, the mobile phone 10 is a mobile communication terminal which can perform mobile communication, and is realized by providing a specific program in a mobile phone including a CPU, a storage device, an input/output device, a wireless communication device, and the like. The mobile phone 10 includes a control section 11, an input section 12, a communication section 13, a display section 14, a voice input/output section 15, a storage section 16, and a reader/writer (R/W) 17 connected with the control section 11, a user identity module (UIM) 18 connected with the R/W 17, and the like.

The control section 11 includes a CPU and the like, and is realized by causing the CPU to execute a program stored in a storage device. The control section 11 centrally controls the mobile phone 10. The details of the function of the control section 11 are described later with reference to FIG. 3.

The input section 12 is an input device for inputting information according to the user's operation, such as input buttons for allowing the user to deliver information to the mobile phone 10. The communication section 13 includes an antenna and the like, and controls wireless communication with base stations 22 and 32. The display section 14 is a display device (e.g. display) for allowing the mobile phone 10 to deliver information to the user. The voice input/output section 15 is a voice input/output device, and includes a voice input section (e.g. microphone) for inputting voice and a sound output section (e.g. speaker) which outputs voice.

The storage section 16 is a storage device (e.g. memory or hard disk) which stores a program and data. The storage section 16 stores charge related information relating to a communication charge such as a charge information table and its version information. As shown in FIG. 7, the charge information table indicates roaming communication charges per unit time and the like, in which the country code, time difference, communication provider, outgoing call communication charges per unit time, incoming call communication charges per unit time, and the like are associated with each roaming area such as a destination (roaming) country. FIG. 7 shows the charge information table when the country A is Japan. For example, the outgoing call communication charges differ depending on the attribute of the destination area, such as communication from the roaming area in which the mobile phone 10 is located (country B in this embodiment) to the same roaming area (country B), communication from the roaming area (country B) to the user's home area (Japan), or communication from the roaming area (country B) to an area other than the above areas (Japan and country B).

The R/W 17 is a communication interface with the UIM 18, and writes data into or reads data from the UIM 18 under control of the control section 11.

The UIM 18 is an IC card which records user identification information. The UIM 18 is installed in the mobile phone 10 and used for user identification and the like. The UIM 18 includes a central processing unit (CPU), a storage device such as a RAM, ROM, or EEPROM, a communication interface (e.g. contact terminal) which interfaces communication with the R/W 17, and the like (not shown). The UIM 18 is a portable information processing device which can communicate with the mobile phone 10 through the R/W 17, receives a command (instruction) from the mobile phone 20, performs processing according to the command, and transmits the processing result to the mobile phone 20 as a response.

The UIM 18 also records user's personal information such as a telephone book and credit payment personal identification information. The UIM may be called a universal subscriber identity module (USIM) or a subscriber identity module (SIM). Note that an SD card having a similar function and including a chip module may be installed in the mobile phone 10 instead of the UIM 18. The type of IC card installed in the mobile phone 10 is not limited.

The UIM 18 stores location information. The location information is information which includes a country code which identifies the country in which the mobile phone 10 is located, a communication network code for identifying the communication network in which the mobile phone 10 is located, a location code which indicates the visited location and is used to identify the wireless zone (location registration area) of the communication system 20, and the like, and indicates the location of the mobile phone 10 and an available communication network. Each of the base stations 22 and 32 provided corresponding to the wireless zone of the mobile communication system 1 continuously and repeatedly transmits location registration area information including a location code for identifying the wireless zone. The base station 22 of a home network 20 continuously and repeatedly transmits the location registration area information including a country identification code indicating the country A and a communication network identification code indicating the home network 20, and the base station 32 of a roaming network 30 transmits the location registration area information including the country identification code indicating the country B and the communication network identification code indicating the roaming network 30. The mobile phone 10 receives the location registration area information repeatedly transmitted from the nearest base station, and, when the location information included in the location registration area information has been changed, writes the location information in the UIM 18 to update the location information (see FIG. 3 described later).

The mobile communication system 2 includes the home network 20 which is a mobile communication system provided in the country A, the roaming network 30 which is a mobile communication system provided in the country B, and the like (see FIG. 1). The home network 20 and the roaming network 30 are connected through a communication line and a point of interface (POI). The mobile communication system 2 controls connection of roaming communication by the mobile phone 10. The home network 20 is a mobile communication system which provides a mobile communication service such as a mobile phone call service to the mobile phone 10 in the country A, and is managed by a communication provider (communication provider A) with which the user of the mobile phone 10 has a communication service agreement. The roaming network 30 is a system which is managed by a communication provider B with which the communication provider A has a roaming agreement and provides a mobile communication service in the country B.

The home network 20 includes a switchboard 21, the base station 22, an HLR 23, and a charge information related server 24 connected with the switchboard 21, and the like. The base station 22 is distributed in the country A corresponding to the wireless zone, and performs wireless communication with the mobile phone 10 in the corresponding wireless zone, such as transmitting the location registration area information in the corresponding wireless zone (location registration area).

The switchboard 21 controls call connection from or to the mobile phone 10 in the communication area of the home network 20. The HLR 23 is a home location register which performs movement management and call management for the mobile phone 10, in which subscriber information is registered. The mobile phone 10 performs wireless communication with the base station 22 in the country A, and communicates with another communication terminal through the switchboard 21 connected with the base station 22.

The charge information related server 24 is realized by providing a specific program and data in a server computer including a CPU, a storage device, an input/output device, a communication device, and the like. The charge information related server 24 stores charge related information such as a charge information table and its version information. As shown in FIG. 7, the charge information table indicates roaming communication charges per unit time and the like, in which the country code, time difference, communication provider, outgoing call communication charges per unit time, incoming call communication charges per unit time, and the like are associated with each destination (roaming) country.

The charge information related server 24 determines whether or not the charge information table stored in the mobile phone 10 is the latest charge information table in response to inquiry the from the mobile phone 10. When the charge information table is not the latest charge information table, the charge information related server 24 provides the latest charge information table to the mobile phone 10 (see FIG. 3 described later).

The roaming network 30 includes the base station 32 distributed in the country B corresponding to the wireless zone, a switchboard 31 which is connected with the base station 32 and controls call connection when the mobile phone 10 in the communication area of the roaming network 30 makes an outgoing call or receives a call. The mobile phone 10 performs wireless communication with the base station 32 in the roaming network 30, and communicates with another communication terminal through the switchboard 31 connected with the base station 32.

Figure 3:
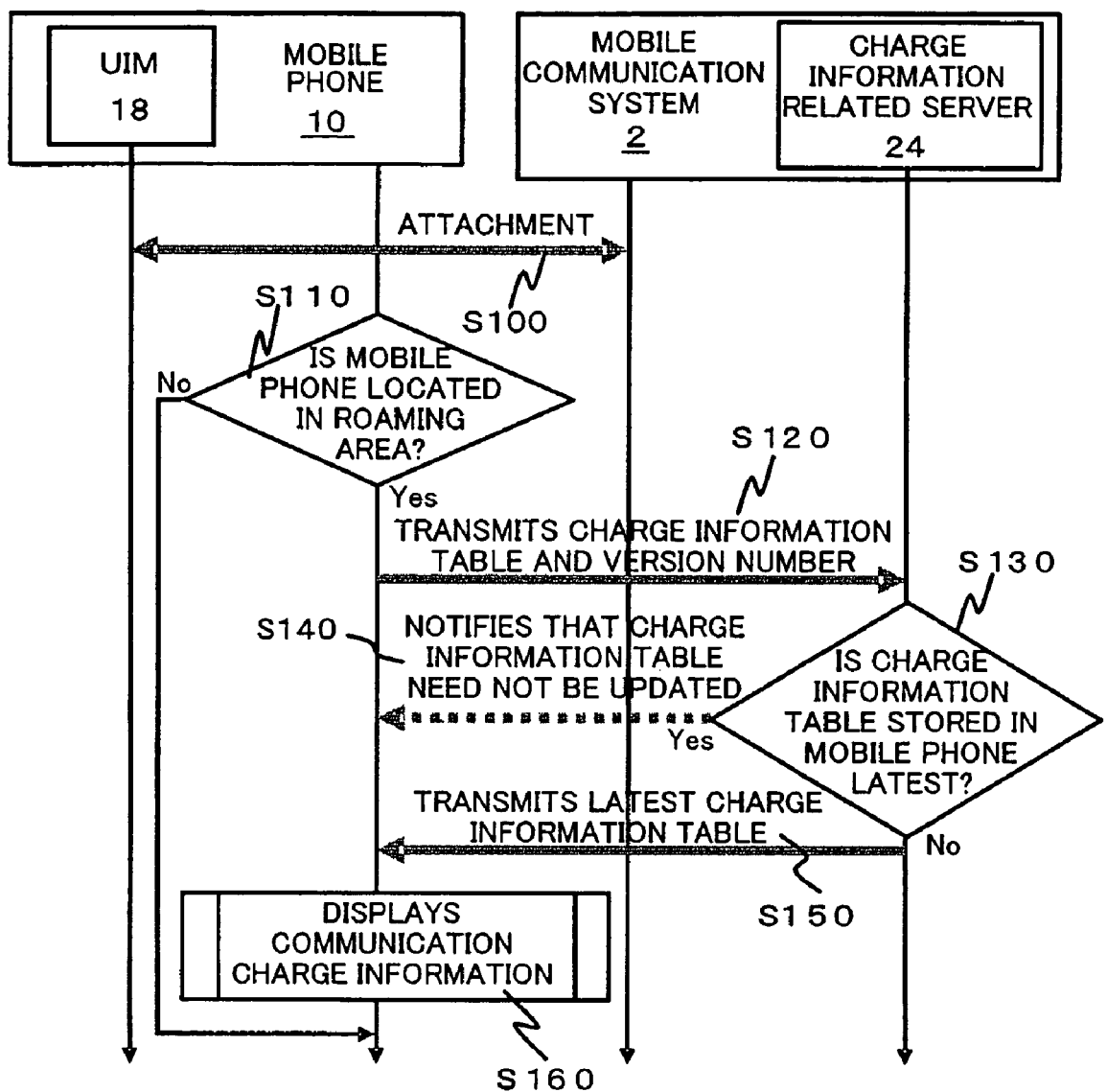
FIG. 3 is a flowchart showing the operation, program, and communication charge notification method of a mobile communication terminal and a mobile communication system according to the present invention (first embodiment).

FIG. 3 is a flowchart showing the operation, program, and communication charge notification method of the mobile communication terminal and the mobile communication system according to the present invention. FIG. 3 shows the process of notifying the user of the communication charge when the mobile phone 10 makes an outgoing call. The following description focuses on the processing of the control section 11 of the mobile phone 10, the HLR 23 of the mobile communications network system 2, and the charge information related server 24.

The user turns on the mobile phone 10 for the first time after entering the country B. In a step 100 ("step" is hereinafter abbreviated as "S"), the mobile phone 10 selects a network, and attachment occurs between the mobile phone 10 and the mobile communication system 2, as shown in FIG. 3. Then, the mobile phone 10 receives the location registration area information from the nearest base station 32 of the roaming network 30, and determines whether or not the location information included in the location registration area information differs from the location information which has been received from the base station 22 and stored in the UIM 18 before leaving the country A. After confirming the difference in the location information, the mobile phone 10 updates the location information stored in the UIM 18 and transmits a location registration request to the base station 32. In the mobile communication system 2, the switchboard 31 receives the location registration request through the base station 32, transfers the location registration request to the HLR 23, and updates the location information of the mobile phone 10 to the location information including the country code of the country B, the communication network code of the roaming network 30, and the location code of the wireless zone in which the mobile phone 10 is located.

The mobile phone 10 detects that the mobile phone 10 is located in the roaming area based on the location information received from the base station 32, and identifies that the roaming area in which the mobile phone 10 is located is the country B (S110). The mobile phone 10 transmits the version information such as the version number of the charge information table stored in the storage section 16 to the switchboard 31, and the switchboard 31 transfers the version information to the charge information related server 24 (S120).

The charge information related server 24 determines whether or not the charge information table stored in the mobile phone 10 is the latest charge information table based on the version information (S130). When the charge information related server 24 has determined that the charge information table is the latest charge information table, the charge information related server 24 transmits to the mobile phone 10 a notification indicating that the charge information table need not be updated (S140). The mobile phone 10 receives the notification, reads the communication charge information of the country B from the charge information table stored in the storage section 16 based on the location information received from the base station 32, displays the communication charge information on the display section 14 (S160) to notify the user of the communication charge information.

When the charge information related server 24 has determined that the charge information table is not the latest charge information table, the charge information related server 24 transmits the latest charge information table to the mobile phone 10 (S150). The mobile phone 10 receives the latest charge information table and writes the latest charge information table into the storage section 16 to update the charge information table. The mobile phone 10 then reads the communication charge information of the country B from the charge information table stored in the storage section 16 and displays the communication charge information on the display section 14 (S160).

As described above, according to the first embodiment, when the mobile phone 10 is turned on and detects that the mobile phone 10 is located in the country B, the mobile phone 10 displays the communication charge information of the country B on the display section 14 to notify the user of the communication charges. Therefore, the user can be simply notified of the communication charges before performing roaming communication, whereby convenience to the user can be improved, and the user can be prevented from being unexpectedly charged for the use of roaming.

Since the mobile phone 10 detects that it is located in the country B based on the location registration area information transmitted from the mobile communication system 2 to each area, the location of the mobile phone 10 can be efficiently detected by utilizing known processing performed between the mobile communication terminal and the mobile communication system. Moreover, the present invention can be realized without modifying a known mobile communication system to a large extent.

In addition, since the mobile phone 10 acquires the latest communication charge information from the mobile communication system 2, the user can be notified of correct communication charge information.

Second Embodiment

Figure 4:
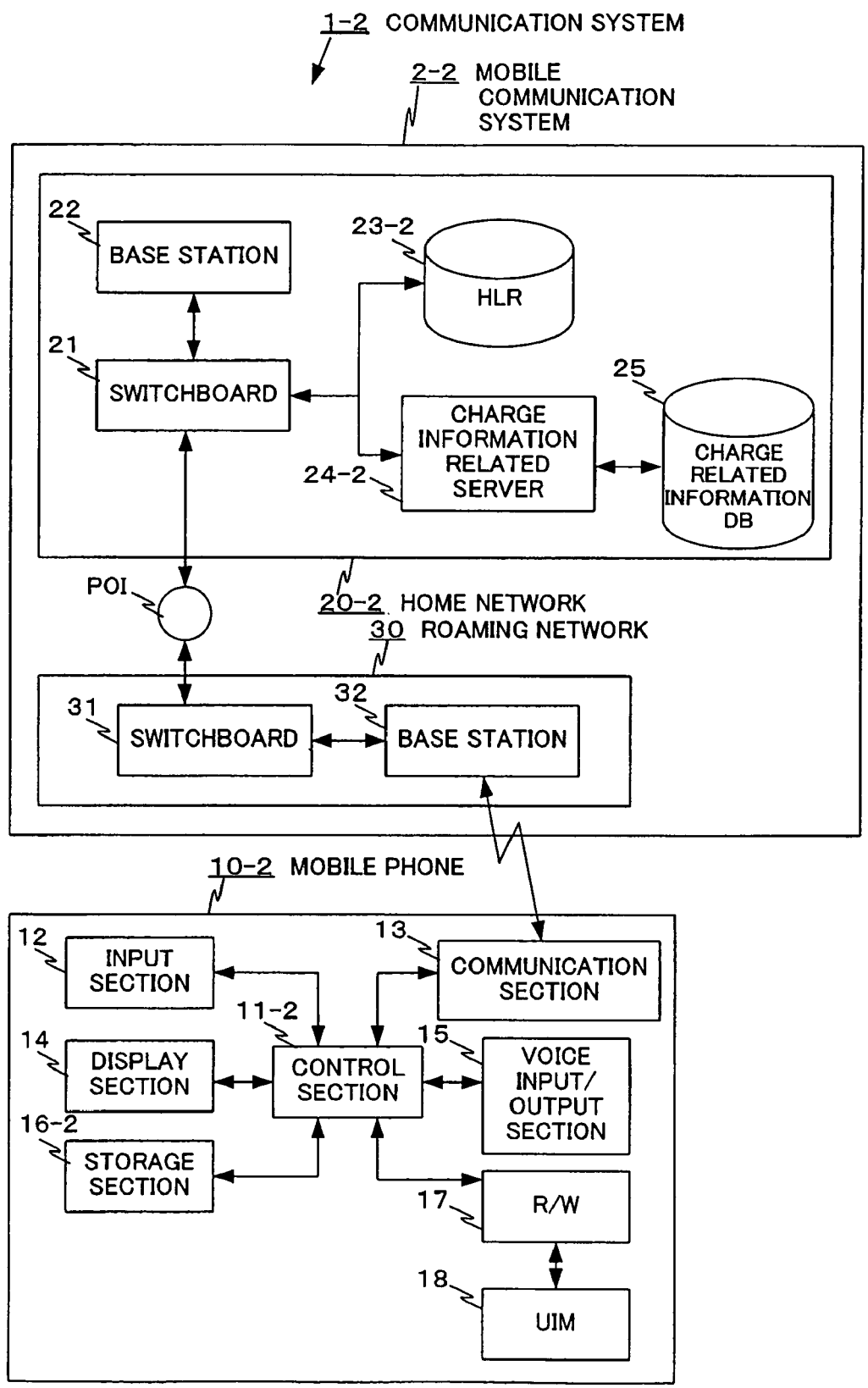
FIG. 4 is a block diagram showing a configuration of a mobile communication terminal and a mobile communication system according to the present invention (second embodiment).

FIG. 4 is a block diagram showing a configuration of a mobile communication terminal and a mobile communication system according to a second embodiment of the present invention.

Note that sections having the same functions as in the first embodiment are indicated by the same symbols or symbols to which an identical symbol is attached on the end. Description of these sections is appropriately omitted.

As shown in FIG. 4, a communication system 1-2 includes a mobile phone 10-2 and a mobile communication system 2-2, and allows the mobile phone 10-2 carried out from the country A to the country B to communicate with another communication terminal through the mobile communication system 2-2.

The mobile phone 10-2 includes a control section 11-2, the input section 12, the communication section 13, the display section 14, the voice input/output section 15, a storage section 16-2, and the R/W 17 connected with the control section 11-2, the UIM 18 connected with the R/W 17, and the like.

The control section 11-2 includes a CPU and the like, and is realized by causing the CPU to execute a program stored in a storage device. The control section centrally controls the mobile phone 10. The details of the function of the control section 11 are described later with reference to FIG. 5. The storage section 16-2 need not store the charge related information such as the charge information table, differing from the first embodiment.

The mobile communication system 2-2 includes a home network 20-2 and a roaming network 30 connected through a communication line and a POI, for example.

The home network 20-2 includes the switchboard 21, the base station 22, an HLR 23-2, and a charge information related server 24-2 connected with the switchboard 21, a charge related information database 25 ("database" is hereinafter abbreviated as "DB") connected with the charge information related server 24-2, and the like.

When the HLR 23-2 has updated the location information of the mobile phone 10-2 in response to the location registration request from the mobile phone 10-2, the HLR 23-2 notifies the charge information related server 24-2 to that effect.

Figure 5:
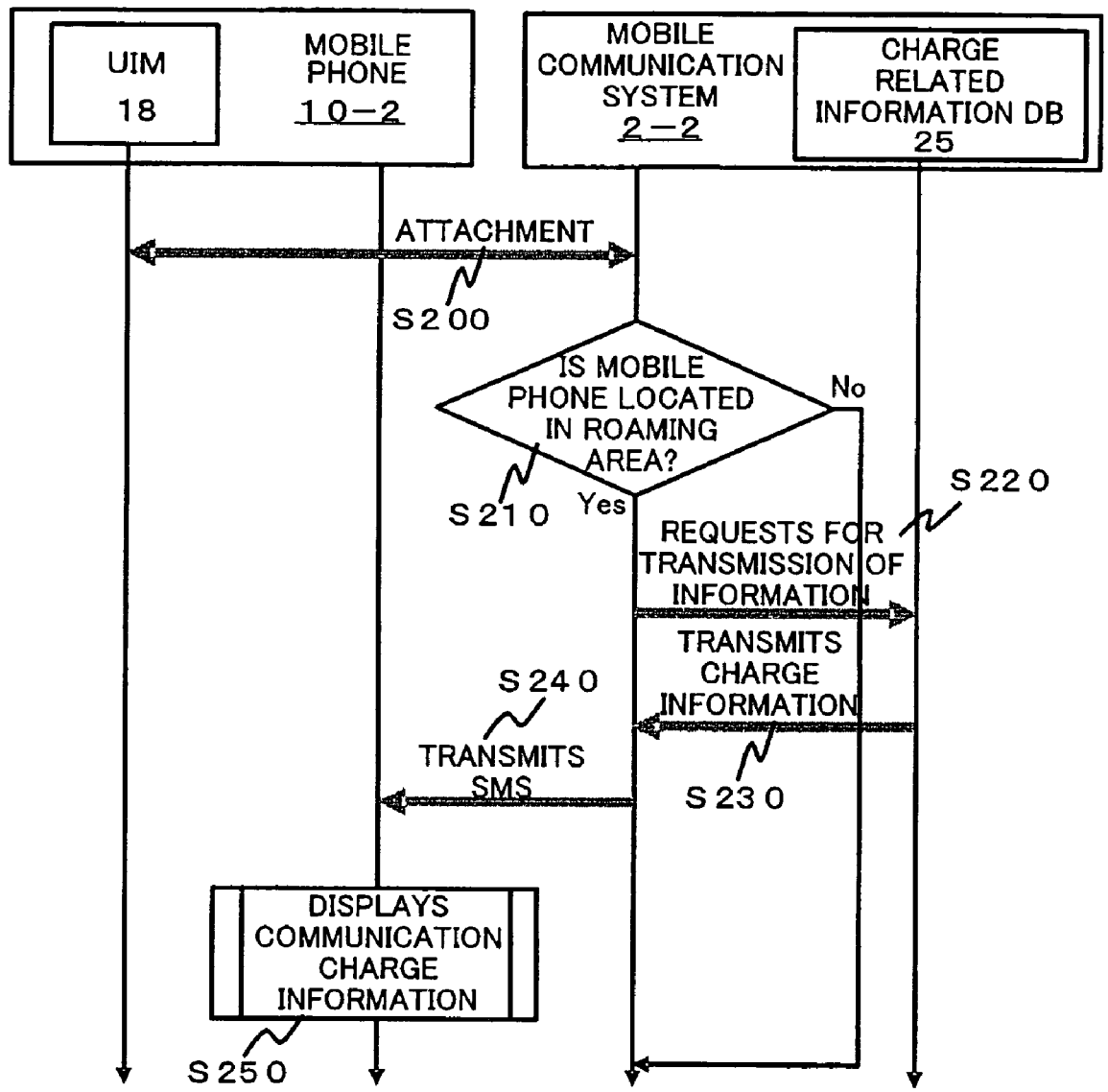
FIG. 5 is a flowchart showing the operation, program, and communication charge notification method of a mobile communication terminal and a mobile communication system according to the present invention (second embodiment).

When the charge information related server 24-2 receives the location information change notification from the HLR 23-2, the charge information related server 24-2 detects that the mobile phone 10 is located in the roaming area of the country B based on the updated registration position of the mobile phone 10, acquires the charge information corresponding to the country B from the charge related information DB 25, and provides the charge information to the mobile phone 10 (see FIG. 5 described later).

FIG. 5 is a flowchart showing the operation, program, and communication charge notification method of the mobile communication terminal and the mobile communication system according to the present invention. FIG. 5 shows the process of notifying the user of the communication charge when the mobile phone 10-2 makes an outgoing call. The following description focuses on the processing of the control section 11-2 of the mobile phone 10-2, the HLR 23-2 of the mobile communications network system 2-2, and the charge information related server 24-2.

As shown in FIG. 5, the user turns on the mobile phone 10-2 for the first time after entering the country B, and attachment occurs between the mobile phone 10-2 and the mobile communication system 2-2 (S200). After confirming the difference in the location code, the mobile phone 10-2 updates the location information stored in the UIM 18 and transmits a location registration request to the base station 32. The HLR 23-2 updates the location information of the mobile phone 10-2 to the location information indicating the wireless zone in which the mobile phone 10-2 is located in the country B in response to the location registration request, and notifies the charge information related server 24-2 to that effect. The charge information related server 24-2 receives the location information change notification from the HLR 23-2, and detects that the mobile phone 10-2 is located in the roaming area of the country B based on the location information change notification (S210). The charge information related server 24 requests the charge related information DB 25 to transmit the charge information corresponding to the roaming area (country B) (S220), and receives the charge information (S230).

The charge information related server 24 transmits the charge information received from the charge related information DB 25 to the mobile phone 10-2 through the switchboard 31 using a short message service (SMS) (S240). The mobile phone 10-2 receives the SMS and displays the charge information on the display section 14 (S250).

As described above, according to the second embodiment, the same effect as in the first embodiment 1 can be obtained even when the mobile communication system 2-2 detects the roaming area of the mobile phone 10-2, stores the communication charge information, and provides the communication charge information to the mobile phone 10-2.

Modification

The present invention is not limited to the above-described embodiments, and various modifications and variations may be made. Such modifications and variations are also within the scope of equivalence of the present invention. In the above-described embodiment, the communication system 1 or 1-2 displays the communication charges to the mobile phone 10 or 10-2 when the mobile phone 10 or 10-2 has been turned on after entry into the country B and attached to the mobile communication system. Note that the event which prompts the communication system to notify the user of the communication charges is not limited thereto. When the country A and the country B are connected by land and the mobile phone 10 or 10-2 is moved from the communication area of the home network 20 or 20-2 to the communication area of the roaming network 30 in a state in which the mobile phone 10 or 10-2 is turned on, the communication charges may be displayed on the display section 14 when it has been detected that the mobile phone 10 or 10-2 is located in the roaming area, and the user may be notified by an alarm such as voice or a vibration. When it has been detected that the mobile phone 10 or 10-2 is located in the roaming area, the mobile phone 10 or 10-2 may notify the user that the mobile phone 10 or 10-2 is located in the roaming area or that the communication charges differ from the communication charges in the country A, and may display the communication charge information when requested by the user.

When the user makes a call using the mobile phone 10 or 10-2 in the roaming area, the communication charges may be displayed on the display section 14 when the user has directed the mobile phone 10 or 10-2 to make a call by operating the input section 12 or the user has directed the mobile phone 10 or 10-2 to prepare to make a call, such as calling the telephone book function of the mobile phone 10 or 10-2. In this case, the communication charge information may be updated or the mobile phone 10 or 10-2 and the charge information related server 24 or 24-2 may communicate in order to acquire the communication charge information when it has been detected that the mobile phone 10 or 10-2 is located in the roaming area or when the user has directed the mobile phone 10 or 10-2 to make a call. The timing at which the communication charge information is updated or the mobile phone 10 or 10-2 and the charge information related server 24 or 24-2 communicate is not limited insofar as the timing occurs in the period between the time at which it is detected that the mobile phone 10 or 10-2 is located in the roaming area and the time at which the communication charges are displayed. When the above timing occurs when the user has directed the mobile phone 10 or 10-2 to make a call, the mobile communication system 2 or 2-2 may identify the country in which the destination communication terminal exists based on the telephone number (fixed telephone), information from the HLR in which the subscriber information of the destination communication terminal is stored, and the like, and may display the communication charges corresponding to the origin country (country B) and the destination country on the display section 14. This allows the user to be appropriately notified of the communication charge information, because the user can determine whether or not to proceed with the call based on the communication charge information displayed in relation to the call operation.

When the mobile phone 10 or 10-2 receives a call in the roaming area, the communication charge information for communication after receiving the call may be displayed on the display section 14 when call reception processing has been performed before the communication is established. Specifically, the communication charge information may be displayed on the display section 14 when processing such as authentication, channel notification reception, or calling has been performed before the mobile phone 10 or 10-2 returns a response notification to the caller to establish communication. In this case, the timing at which the mobile phone 10 or 10-2 and the charge information related server 24 or 24-2 communicate in order to update the communication charge information or acquire the communication charge information is not limited. The mobile communication system 2 or 2-2 may identify the country in which the caller's communication terminal exists based on the caller's telephone number and the like, and may display the communication charges corresponding to the origin country and the destination country (country B) on the display section 14.

This allows the user to be appropriately notified of the communication charge information, because the user can know the communication charges immediately before answering the call and determine whether or not to answer the call.

In the above-described embodiment, when the mobile phone 10 or 10-2 is located in two or more roaming areas, the communication system 1 may detect that the mobile phone 10 or 10-2 is located in two or more roaming areas, and notify the user of the communication charge information of each roaming area The statement "the mobile phone 10 or 10-2 is located in two or more roaming areas" means that the roaming network 30 managed by the communication provider B and a roaming network 30' (not shown) managed by a communication provider C which makes a roaming agreement with the communication provider A exist in the country B, and the mobile phone 10 or 10-2 is located in the area in which the roaming area in which the roaming service is provided by the roaming network 30 and the roaming area in which the roaming service is provided by the roaming network 30' overlap.

The mobile phone 10 or 10-2 receives the location registration area information transmitted from the base station 32 of each of the roaming networks 30 and 30', and detects that the mobile phone 10 or 10-2 is located in the roaming networks 30 and 30' based on the communication network code included in the location registration area information. When the mobile phone 10 or 10-2 is located in this area, the communication system 1 may notify the user of the communication charge information of the roaming area of the roaming network 30 and the communication charge information of the roaming area of the roaming network 30'. As the notification method, the communication system 1 may separately notify the user of the information of each communication provider such as the communication charge information of each of the roaming networks 30 and 30' using an SMS or the like, or may collectively notify the user of the communication charge information of each of the available roaming networks 30 and 30' using an SMS or the like when the communication system 1 has detected that the mobile phone 10 or 10-2 is located in the roaming networks 30 and 30'. The communication system 1 may also notify the user of the information of communication providers in the country B such as the communication charges for all roaming networks available in the country B. The communication system 1 may not notify the user of this information when the location of the mobile phone 10 or 10-2 is registered again in the country B through the roaming networks 30 and 30' after the communication. When the communication system 1 separately notifies the user of the communication charges, the communication system 1 may not notify the user of the communication charges when the location of the mobile phone 10 or 10-2 is registered again through the roaming networks 30 and 30'.

In general, when the mobile phone 10 can use two or more communication networks provided by two or more communication providers, the mobile phone 10 selects one of the communication networks based on whether or not the home network is included, whether or not the communication network previously used is included, the field intensity of the communication network, the priority network list stored in the USIM 18, and the like.

The user can select the communication network by being collectively notified of the communication charges for the available roaming networks 30 and 30', whereby convenience to the user can be improved. The mobile phone 10 may be set to automatically use a less expensive roaming network when acquiring the communication charges for the roaming networks 30 and 30', and the user may be notified of the communication charges for the less expensive roaming network.

In the above-described embodiment, the mobile communication system 2 or 2-2 registers the location information indicating the location in the country B in the HLR 23 or 23-2. When the roaming network 30 is provided with a gateway location register (GLR), the mobile communication system 2 or 2-2 may register the location information in the GLR. The amount of data transferred between the home network 20 or 20-2 and the roaming network 30 is increased especially in urban areas when the location is registered each time in the HLR 23 or 23-2 of the home network 20 or 20-2 by the roaming service. In order to deal with this problem, the location concerning the movement of the mobile phone 10 or 10-2 into the roaming area is registered in the HLR 23 or 23-2 for the first time, and duplicate information is stored in the GLR of the roaming network 30. The location is registered in the GLR for the subsequent movement to reduce the amount of data transferred and to enable utilization of the subscriber information without accessing the HLR 23 or 23-2.

In the above-described embodiment, the HLR 23 or 23-2, the charge information related server 24 or 24-2, and the charge related information DB 25 are provided in the home network 20 or 20-2. Note that the HLR 23 or 23-2, the charge information related server 24 or 24-2, and the charge related information DB 25 may be provided in the roaming network 30 insofar as the HLR 23 or 23-2, the charge information related server 24 or 24-2, and the charge related information DB 25 can communicate with the mobile phone 10 through the switchboard 31 and the like. The installation location and the network to which these elements belong are not limited.

In the above-described embodiment, the mobile phone 10 detects that the mobile phone 10 is located in the roaming area based on the location information received from the base station 32. Note that the detection method is not limited thereto insofar as the mobile phone 10 can detect that it is located in the roaming area based on information received from the base station 32. The mobile phone 10 may detect that it is located in the roaming area based on another piece of information received from the base station 32.

In the first embodiment, the UIM 18, the IC chip attached to the mobile phone 10, or the like may have the functions of the control section 11 and the storage section 16 of the mobile phone 10 according to the present invention, such as detecting that the mobile phone 10 is located in the roaming area, inquiring of the charge information related server 24 relating to the charge information table, and managing the charge information table.

Figure 6:
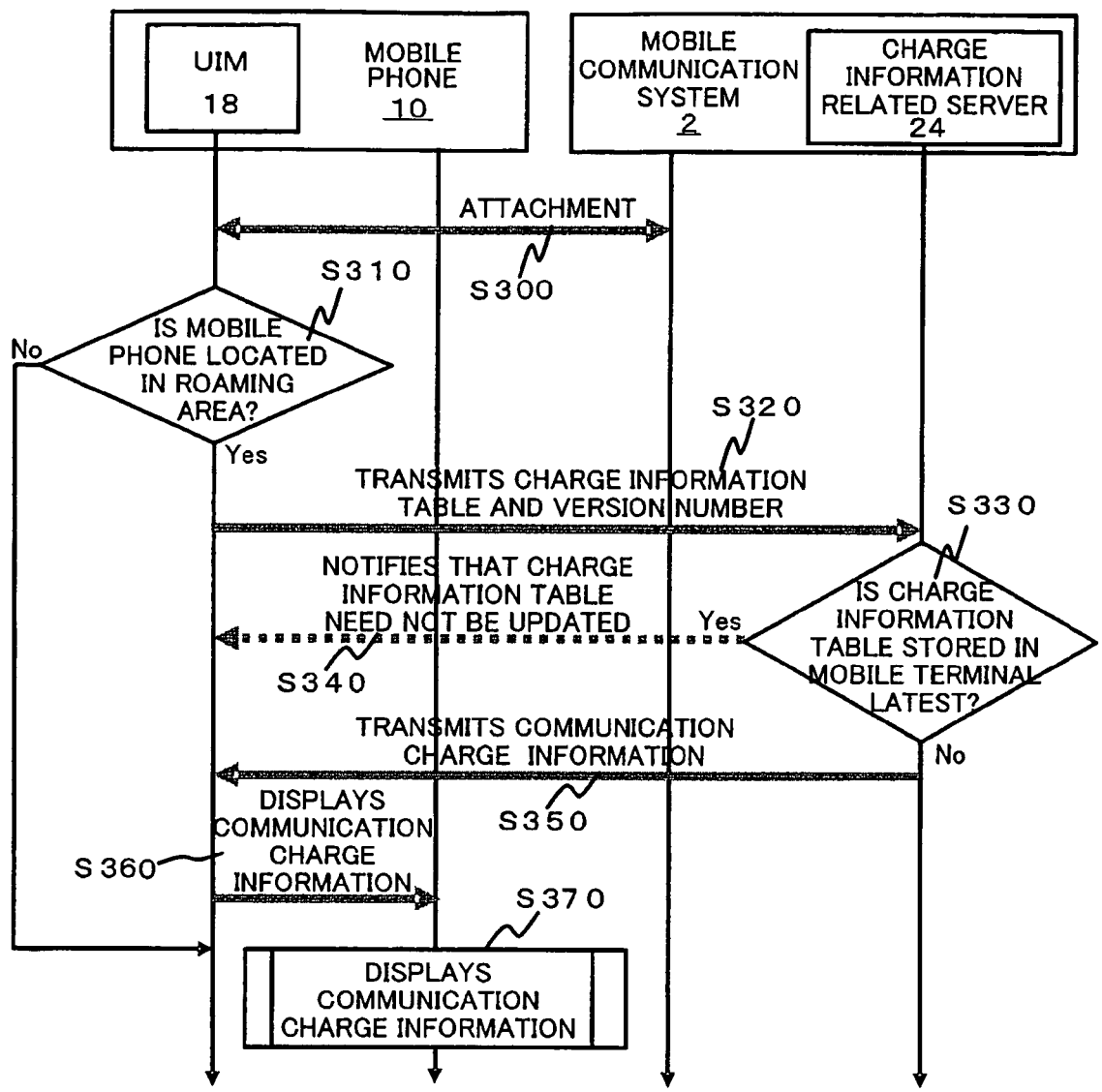
FIG. 6 is a flowchart showing the operation, program, and communication charge notification method of a mobile communication terminal and a mobile communication system according to the present invention (modification).

As shown in FIG. 6, the UIM 18 may request the mobile phone 10 to perform processing using a proactive command or the like to notify the user of the communication charges under control of the UIM 18, for example. The UIM 18 detects that the mobile phone 10 is located in the roaming area based on the location information (S310), and transmits the version information of the stored charge information table to the charge information related server 24 of the mobile communication system 2 through the mobile phone 10 (S320). The charge information related server 24 determines whether or not the charge information table is the latest charge information table (S330). When the charge information related server 24 has determined that the charge information table is the latest charge information table, the charge information related server 24 transmits to the UIM 18 of the mobile phone 10 a notification indicating that the charge information table need not be updated (S340). When the charge information related server 24 has determined that the charge information table is not the latest charge information table, the charge information related server 24 transmits the latest charge information table to the UIM 18 of the mobile phone 10 using a USIM/SIM application toolkit (SAT/USAT) or the like and overwrites the charge information table stored in the UIM 18 with the latest charge information table to update the charge information table (S350). The UIM 18 transmits the communication charge information to the mobile phone 10 and requests the mobile phone 10 to display the communication charge information (S360), and the mobile phone 10 displays the communication charge information (S370).

The present invention can be realized without modifying a known mobile phone to a large extent by providing the UIM 18 having such functions. Likewise, even if the user replaces the mobile phone with another mobile phone, the present invention can be easily realized by providing the UIM 18 to the new mobile phone.

In the first embodiment, when the mobile phone 10 has detected that the mobile phone 10 is located in the roaming area, the mobile phone 10 may request the charge information related server 24 to provide the communication charge information, receive the communication charge information of the roaming area provided from the charge information related server 24 in response to the request, and display the communication charge information on the display section 14.

In the first embodiment, when the mobile phone 10 has detected that it is located in the roaming area, the mobile phone 10 inquires of the charge information related server 24 whether or not the charge information table is the latest charge information table. The inquiry timing is not limited. The inquiry may be performed when making a call, receiving a call, or regularly (e.g. once a week).

Obviously, numerous modifications and variations of the present invention are possible in light of the above teachings. It is therefore to be understood that, within the scope of the appended claims, the invention may be practiced otherwise than as specifically described herein.

What is claimed is:

1. A mobile communication terminal communicating with a mobile communication system, the mobile communication terminal comprising:

base station transmission information reception means for receiving information transmitted from a base station of the mobile communication system;

roaming area detection means for detecting whether or not the mobile communication terminal is located in a roaming area based on the information received by the base station transmission information reception means;

communication charge information acquisition means for acquiring communication charge information of the roaming area in which the mobile communication terminal is located when the roaming area detection means has detected that the mobile communication terminal is located in the roaming area;

communication charge information storage means for storing the communication charge information of the roaming area acquired by the communication charge information acquisition means;

update necessity inquiry means for inquiring of the mobile communication system whether it is necessary to update the communication charge information stored in the communication charge information storage means;

updated information reception means for receiving updated information transmitted from the mobile communication system when the mobile communication system has determined that it is necessary to update the communication charge information in response to the inquiry from the update necessity inquiry means;

update means for updating the communication charge information stored in the communication charge information storage means based on the updated information received by the updated information reception means;

communication charge information read means for reading the communication charge information of the roaming area in which the mobile communication terminal is located from the communication charge information storage means based on information received by the base station transmission information reception means when the roaming area detection means has detected that the mobile communication terminal is located in the roaming area; and communication charge information notification means for notifying a user of the communication charge information acquired by the communication charge information read means;

wherein the communication charge information includes version information identifying whether the communication charge information is the latest information, and the communication charge information storage means having version information storage means in a part of the communication charge information storage means;

the update necessity inquiry means having version information transmission means for transmitting the version information stored in the version information storage means to a side of the mobile communication system, and further comprising:

update-unnecessary information reception means for receiving information that the communication charge information is not a necessary update transmitted from the mobile communication system when the mobile communication system has determined that the communication charge information stored in the communication charge information storage means is the latest information in response to the version information transmitted by the version information transmission means.

2. The mobile communication terminal according to claim 1,
wherein the communication charge information notification means includes a display section to notify the user of the charge information at an appropriate timing.

3. The mobile communication terminal according to claim 1,
wherein the communication charge information acquisition means includes communication charge information request means for requesting a mobile communication system to provide the communication charge information of the roaming area in which the mobile communication terminal is located, and communication charge information reception means for receiving the communication charge information transmitted from the mobile communication system in response to the request from the communication charge information request means.

4. The mobile communication terminal according to claim 1, further comprising:
roaming area notification means for notifying the user that the roaming area detection means has detected that the mobile communication terminal is located in the roaming area;
wherein the communication charge information notification means notifies the user of the communication charge information when directed by the user.

5. The mobile communication terminal according to claim 1,
wherein, when the user has issued a call instruction to a destination the user wishes to reach or a call preparation instruction to a destination the user wishes to reach in the roaming area in which the mobile communication terminal is located, the communication charge information notification means notifies the user of the communication charge information for communication with the destination the user wishes to reach.

6. The mobile communication terminal according to claim 1,
wherein, when receiving a call in the roaming area in which the mobile communication terminal is located, the communication charge information notification means notifies the user of the communication charge information for communication after receiving the call when the receiving call has been processed before the communication is established.

7. The mobile communication terminal according to claim 1,
wherein, when the roaming area detection means has detected that the mobile communication terminal is located in two or more roaming areas, the communication charge information acquisition means acquires the communication charge information of each of the roaming areas in which the mobile communication terminal is located; and wherein the communication charge information notification means notifies the user of the communication charge information of each of the roaming areas acquired by the communication charge information acquisition means.

8. A mobile communication system for allowing roaming communication of a mobile communication terminal, the mobile communication system comprising:
roaming area detection means for detecting whether or not the mobile communication terminal is located in a roaming area based on a location registration request received from the mobile communication terminal;
communication charge information storage means for storing communication charge information indicating communication charges for the roaming communication;
communication charge information read means for reading the communication charge information of the roaming area in which the mobile communication terminal is located from the communication charge information storage means;
communication charge information transmission means for transmitting the communication charge information read by the communication charge information read means to the mobile communication terminal; and
communication means for exchanging information relating to whether it is necessary for the mobile communication system to transmit the communication charge information to the mobile communication terminal between the mobile communication terminal and the mobile communication system;
wherein the communication charge information includes version information identifying whether the communication charge information is the latest information based upon the version information;
the communication charge information transmission means having version information transmission means in a part of the communication charge information transmission means; and
wherein the communication means exchanges information relating to whether it is necessary for the mobile communication system to transmit the communication charge information between the mobile communication terminal and the mobile communication system based upon the version information transmitted by the version information transmission means.

9. A non-transitory computer readable medium embodied with a computer program for execution by a mobile communication terminal communicating with a mobile communication system, the program comprising:
a base station transmission information reception procedure of receiving information transmitted from a base station of the mobile communication system;
a roaming area detection procedure of detecting whether or not the mobile communication terminal is located in a roaming area based on the information received by the base station transmission information reception procedure;
a communication charge information acquisition procedure of acquiring communication charge information of the roaming area in which the mobile communication terminal is located when the roaming area detection procedure has detected that the mobile communication terminal is located in the roaming area;
a communication charge information storage procedure of storing the communication charge information of the roaming area acquired by the communication charge information acquisition procedure;

an update necessity inquiry procedure of inquiring of the mobile communication system whether it is necessary to update the communication charge information stored in the communication charge information storage procedure;

an updated information reception procedure of receiving updated information transmitted from the mobile communication system when the mobile communication system has determined that it is necessary to update the communication charge information in response to the inquiry from the update necessity procedure;

an update procedure of updating the communication charge information stored in the communication charge information storage procedure based on the updated information received by the updated information reception procedure;

a communication charge information read procedure of reading the communication charge information of the roaming area in which the mobile communication terminal is located from the communication charge information storage procedure based on information received by the base station transmission information reception procedure when the roaming area detection procedure has detected that the mobile communication terminal is located in the roaming area; and a communication charge information notification procedure of notifying a user of the communication charge information acquired by the communication charge information read procedure;

wherein the communication charge information includes version information identifying whether the communication charge information is the latest information, and the communication charge information storage procedure having a version information storage procedure in a part of the communication charge information storage procedure;

the update necessity inquiry procedure having version information transmission procedure for transmitting the version information stored in the version information storage procedure to a side of the mobile communication system, and further comprising:

update-unnecessary information reception procedure for receiving information that the communication charge information is not a necessary update transmitted from the mobile communication system when the mobile communication system has determined that the communication charge information stored in the communication charge information storage procedure is the latest information in response to the version information transmitted by the version information transmission procedure.

10. The program according to claim 9, wherein the communication charge information acquisition procedure includes a communication charge information request procedure of requesting a mobile communication system to provide the communication charge information of the roaming area in which the mobile communication terminal is located, and a communication charge information reception procedure of receiving the communication charge information transmitted from the mobile communication system in response to the request from the communication charge information request procedure.

11. The program according to claim 9, further comprising:

a roaming area notification procedure of notifying the user that the roaming area detection procedure has detected that the mobile communication terminal is located in the roaming area;

wherein the communication charge information notification procedure notifies the user of the communication charge information when directed by the user.

12. The program according to claim 9, wherein, when the user has issued a call instruction to a destination the user wishes to reach or a call preparation instruction to a destination the user wishes to reach in the roaming area in which the mobile communication terminal is located, the communication charge information notification procedure notifies the user of the communication charge information for communication with the destination the user wishes to reach.

13. The program according to claim 9, wherein, when receiving a call in the roaming area in which the mobile communication terminal is located, the communication charge information notification procedure notifies the user of the communication charge information for communication after receiving the call when the receiving call has been processed before the communication is established.

14. The program according to claim 9, wherein, when the roaming area detection procedure has detected that the mobile communication terminal is located in two or more roaming areas, the communication charge information acquisition procedure acquires the communication charge information of each of the roaming areas in which the mobile communication terminal is located; and wherein the communication charge information notification procedure notifies the user of the communication charge information of each of the roaming areas acquired by the communication charge information acquisition procedure.

15. A communication charge notification method for execution by a mobile communication system for notifying a user of communication charge information for roaming communication of a mobile communication terminal, the method comprising:

an area detection step of detecting whether or not the mobile communication terminal is located in a roaming area based on information received by the mobile communication terminal from a base station;

a communication charge information acquisition step of acquiring communication charge information of the roaming area in which the mobile communication terminal is located when the area detection step has detected that the mobile communication terminal is located in the roaming area; and a communication charge information notification step of notifying the user of the communication charge information acquired by the communication charge information acquisition step;

wherein the communication charge information includes version information identifying whether the communication charge information is the latest information, and the communication charge information acquisition step having a version information acquisition step, and further comprising:

a communication step of exchanging information relating to whether it is necessary for the mobile communication system to transmit the communication charge information between the mobile communication terminal and the mobile communication system based upon the version information acquired in the version information acquisition step.

* * * * *